2,962,415

SPECIALTY PAPERS CONTAINING A RESIN DISPERSANT AND RETENTION AID AND PROCESS FOR PRODUCING THE SAME

Hanns F. Arledter, Stockbridge, Mass., assignor, by mesne assignments, to Hurlbut Paper Company, a corporation of Ohio No Drawing. Filed Mar. 5, 1956, Ser. No. 569,294

8 Claims. (Cl. 162—145)

The present invention relates to new and useful improvements in the manufacture of paper, and more particularly in the manufacture of specialty papers possessing physical characteristics and properties which are not usually obtainable with papermaker fiber paper.

The objects of the invention are to provide specialty papers which have applications in the decorative laminating field, in the molding and tubing industry, and in the resin-treated paper field in general; strong specialty papers which can be manufactured in a continuous manner with conventional papermaking machinery; specialty papers having resin powder uniformly distributed throughout the structure of the paper; specialty papers having good printability; specialty papers produced by a process allowing high resin powder retention by the paper; and specialty papers produced by a process which maintains a fiber-resin powder slurry uniform and well dispersed during the manufacture of the paper.

The products of the present invention are specialty papers consisting of an interfelted fibrous web containing from about 30% to about 70% by weight of resin powder, from about 70% to about 30% by weight respectively of coarse fibers having a diameter greater than 2 microns, and from about 1% to about 20% by weight based on the weight of the coarse fibers of fine siliceous fibers having a diameter less than 2 microns. The paper may contain as an optional component an amount up to about 45% by weight of at least one filler based on the fibrous content of the paper.

The process of the present invention for producing the specialty papers comprises forming an aqueous suspension containing from about 30% to about 70% by weight of resin powder, from about 70% to about 30% by weight respectively of coarse fibers having a diameter greater than 2 microns, and from about 1% to about 20% by weight based on the weight of the coarse fibers of fine siliceous fibers having a diameter less than 2 microns; pumping the aqueous suspension to the headbox of a papermaking machine; forming a paper web; dewatering the web; and drying the web.

The resin powder incorporated in the specialty papers has a mesh size of about 60 to about 300 or more. Any thermoplastic or thermosetting resin which can be manufactured in powdered form in such particle size and which can be processed to laminates or films under heat and pressure can be utilized in the specialty papers.

Examples of thermosetting resin powders which can be employed include phenolic resins, such as phenol formaldehyde and phenol furfural resins; benzoguanamine formaldehyde resins; diallyl phthalate polymers; and silicone resins. Typical examples of themoplastic resin powders which can be utilized include polyacrylic resins, such as polymethylmethacrylate; polyvinylchloride; cellulose acetate; cellulose butyrate; polyethylene; polystyrene; polyvinylbutyral; polytetrafluoroethylene (Teflon); and polyvinylacetate.

The coarse fibers have a diameter greater than 2 microns, for example, from 5.5 to 9.0 microns for glass fibers or 8–40 microns for papermaker fibers and organic synthetic fibers. The following coarse fibers are typical of those which may be employed either alone or in mixtures: the so-called "papermaker fibers" such as kraft, alpha cellulose, sulfite cellulose, cotton, hemp, rag, esparto, straw, bagasse, and the like; synthetic organic fibers, such as polyamide resin fibers made by the polymerization of a hexamethylenediamine salt of adipic acid (nylon), polytetrafluoroethylene fibers (Teflon), synthetic fibers made by the condensation of dimethylterephthalate and ethylene glycol (Dacron), polyacrylonitrile fibers (Orlon), synthetic fibers made by the copolymerization of 40% acrylonitrile and 60% vinylchloride (Dynel), polyvinylchloride fibers, polyvinylidene chloride fibers (Saran), dinitrile fibers, cellulose acetate fibers, cellulose triacetate fibers, and viscose rayon fibers; synthetic inorganic fibers, such as glass, silica, aluminum silicate, steel-wool and the like; and natural inorganic fibers, such as asbestos.

The fine siliceous fibers have a diameter less than 2 microns. Examples of such siliceous fibers include glass fibers and asbestos fibers. The glass fibers have a diameter from 0.1 to 2.0 microns, while the asbestos fibers have a diameter from 0.02 to 0.05 microns.

The fine siliceous fibers act as a resin or filler dispersant and retention aid. The many fine siliceous fibers uniformly distributed throughout the paper stock allow uniform distribution of resin powder and filler in the wet sheet during the formation of the same on the wire of a paper machine, thereby preventing two-sidedness or uneven resin distribution therein. For example, a specialty paper containing a resin powder of dark color produced on the wire of a paper machine without the presence of the fine siliceous fibers in the paper stock has a dark resin color on the felt side of the paper and a very light resin color on the wire side of the paper, thereby indicating a decreasing resin powder concentration in the paper in passing from the felt side of the paper to the wire side thereof. On the other hand, a specialty paper containing the fine siliceous fibers and also containing a resin powder of dark color has a dark resin color on both the felt side and the wire side of the paper, thereby indicating a uniform distribution of resin powder throughout the paper.

The fine siliceous fibers act as a resin and filler retention aid for the following reasons. The interstices of the wire of a paper machine and the pores of a wet paper web thereon are larger than the particle size of the resin powder or filler. When suction is applied to a wet paper web without the presence of the fine siliceous fibers to dewater the same by removal of white water, the small resin powder particles and filler particles are sucked through the pores of the paper and interstices of the wire of the paper machine, especially on the wire side of the paper, thereby producing non-uniform resin powder and filler distribution throughout the paper structure and resulting in a loss of resin powder and filler therefrom. On the other hand, when a wet paper web is formed containing fine siliceous fibers having a diameter less than 2 microns, the vast number of such fine siliceous fibers overlap the pores in the paper and thereby reduce the pore size of the paper to such an extent that the pore size is smaller than the size of the resin powder particles and filler particles. Hence the fine siliceous fibers uniformly entrap the resin powder and filler particles within the paper structure. When suction is applied to such a paper to dewater the same by removal of white water, the resin powder particles and filler particles are uniformly retained within the paper structure so that there is no decrease in concentration of the resin powder particles or filler particles in passing from the felt side to the wire side of the wet paper web. Even though the fine siliceous fibers materially decrease the pore size and increase the density of the wet paper web, the stock is still free and dewatering is fast.

The use of well fibrillated cellulose also yields fine, but very short, fibrils. While such fibers improve resin powder and filler retention somewhat, it was found that the dewatering of the slimy, slow stock on the paper machine became very difficult, making the production of paper of, for example, 200 pound basis (24 inches by 36 inches—500 sheets) slow and uneconomical, or even impossible. Accordingly, such fine fibers are unsuited for use in the product and process of the invention.

As noted above, the specialty papers may contain an amount, e.g., 0.5%, up to about 45% by weight of at least one filler based on the fibrous content of the paper. By the term "filler" is meant such fillers as are conventionally employed in papermaking as well as pigments. Typical fillers which may be employed include titanium dioxide, zinc sulfide, kaolin, diatomaceous earth, barium sulfate, and organic and inorganic pigments. Films or laminates made from the specialty papers containing the optional filler may be either transparent or opaque and may have any color shade desired. Fluorescent or luminescent materials in powder form may be incorporated into the specialty papers and the laminates or films formed therefrom will have high light emission properties, especially if the specialty papers are in transparent form. The use of fillers improves the absorbency and printability characteristics of the specialty papers.

In carrying out the process of the invention it is preferred to incorporate the fine siliceous fibers into the aqueous suspension of coarse fibers and resin powder, either with or without a filler, in the form of a dispersion in which the fine siliceous fibers are individualized. Fine fibers tend to agglomerate and form fiber bundles. Any fiber bundle would act as only one fiber and therefore many more fibers would be necessary in order to obtain the same results.

Fine glass fibers, for example, disperse more readily if the fiber slurry is processed at a pH of 2.8 to 3.4. A 0.75 micron glass fiber slurry, for example, yields the following results:

| Medium | pH | Fiber Dispersion | Freeness SF (2 g. in 1000 cc.) | Drainage Time (Seconds) |
|---|---|---|---|---|
| Water | 6.3 | Fair | Approx. 54 | 73 |
| Water+Alum | 4.3 | do | Approx. 54 | 73 |
| Water+Sulfuric Acid | 3.3 | Very good | 64 | 75 |

The gelatinous glass fiber individualization in this manner becomes quite clear as seen from this freeness test. Such a fine glass fiber slurry also has a higher viscosity and maintains the filler and resin powder particles in better suspension. It will be appreciated, however, that there are also other methods of individualizing fine glass fibers with dispersing agents, fatty acids, carboxymethylcellulose, and the like.

When asbestos fibers are employed as the fine siliceous fibers, it is preferred that colloidized asbestos fibers be used. A suitable method of obtaining asbestos dispersions is set forth in United States Patent No. 2,626,213 issued to I. J. Novak. Straight XX asbestos papermaking fibers possess a Williams freeness at 3 grams in 1000 cc. of 260–420 seconds. The same asbestos fibers, properly dispersed with an organic crysotile asbestos colloidizing agent of the nature of a sulfonated ester, increase the freeness of the fiber dispersion to 10,000–50,000 seconds.

It is possible to manufacture film as well as laminates from the specialty papers of the invention. In the case of films, the specialty paper is heat-calendered with a heat and pressure calender, or in presses, at an appropriate temperature according to the melting or softening point of the resin.

The product and process of the invention will be further illustrated in connection with the following examples.

EXAMPLE 1

Twenty pounds of fine glass fibers having a diameter of 0.75 micron were well dispersed under the brushing action of a stainless steel beater roll in 500 gallons of water to which 120 cc. of concentrated sulfuric acid had been added to obtain a pH of approximately 3.2. After the fine glass fibers had been individualized, 500 gallons of water, 60 cc. of sulfuric acid, and 180 pounds of coarse glass fibers having a diameter of 3.5–5 microns were added and dispersed. The stock was then diluted with water to 1500 gallons and 600 pounds of 300 mesh benzoguanamine formaldehyde resin powder was dispersed in the fiber slurry. The beater content was then mixed with a fiber slurry consisting of 1000 gallons of water containing 200 pounds of coarse Orlon fibers until the stock was smooth. The stock was neutralized with ammonia and pumped to the headbox of a papermaking machine where a 5% synthetic neoprene rubber emulsion was added and flocculated with a 5% solution of 75% urea and 25% melamine resin. 2–3% synthetic rubber and 1.2% resin were added in this manner. The aqueous dispersion was fed to the wire of a papermaking machine where a paper web was formed and dewatered and then subsequently dried. The specialty paper formed thereby had a uniform resin powder concentration throughout and contained 60% by weight benzoguanamine formaldehyde resin powder, 40% by weight coarse fibers (18% by weight coarse glass fibers and 22% by weight coarse Orlon fibers), and 5% by weight fine glass fibers based on the weight of the coarse fibers.

EXAMPLE 2

500 parts of coarse kraft pulp were beaten in a conventional papermaker beater to a beating degree of 17° S.R. at a stock consistency of 6%. 400 parts of phenol formaldehyde resin powder with a softening point of 70°–85° C. and a mesh size of about 300 was added to 2000 parts of colloidized asbestos fiber slurry containing 12.5 parts of 3R grade asbestos (0.02–0.05 micron fiber diameter) and sufficient Aerosol OT (dioctyl ester of sodium sulfosuccinate) to obtain a smooth dispersion. The kraft pulp was slowly added to the slurry containing the resin powder and fine asbestos fibers and the diluted slurry pumped to the headbox of a Fourdrinier pilot machine. The fiber slurry was flocculated in the headbox with a solution of 0.5% sodium abietinate and alum. The aqueous slurry was then formed into a paper web on the Fourdrinier machine and dewatered and the paper web dried. The specialty paper so produced contained 56% by weight of coarse kraft fibers, 44% by weight of phenol formaldehyde resin powder, and 2.5% by weight of fine asbestos fibers based on the weight of the coarse fibers and had a uniform resin powder concentration throughout the specialty paper.

There is set forth below in Tables I and II data comparing the properties of specialty papers produced in accordance with the process of the invention and the properties of a paper produced in accordance with the process of the invention but without fine siliceous fibers serving as a resin retention and dispersion aid.

In Table I Paper A contained 100 parts of coarse glass fibers having a diameter of 5.5 micron and 200 parts of polymerized methylmethacrylate resin powder. Accordingly, Paper A contained 33% by weight of coarse glass fibers and 67% by weight of polymerized methylmethacrylate resin powder. Paper B in Table I contained 90 parts of coarse glass fibers having a diameter of 5.5 microns, 200 parts of polymerized methylmethacrylate resin powder, and 5 parts of colloidal asbestos fibers having a diameter of 0.02–0.05 micron. Accordingly, Paper B contained 31% by weight of coarse glass fibers, 69% by weight of polymerized methylmethacrylate resin powder, and 5.5% by weight of fine asbestos fibers based on the weight of the coarse fibers present in the specialty paper.

*Table I*

| Fiber Mixture | Paper A | Paper B |
|---|---|---|
| Percent Resin Retention | 70 | 90. |
| Grams Per Liter of Resin in White Water | 1.2 | 0.22. |
| Uniformity of Resin Distribution in Paper | very poor | very good. |
| Dispersibility of Solids in Aqueous Suspension | do | Do. |

It will be noted from Table I above that Paper B produced in accordance with the process of the invention had a very high resin powder retention after dewatering, very good uniformity of resin powder distribution in the paper product, and also very good dispersibility of the aqueous suspension of the paper stock. Paper A, on the other hand, wherein no fine siliceous fibers were employed had a very low resin powder retention after dewatering, a very poor uniformity of resin powder distribution in the paper product, and a very poor dispersibility of the aqueous paper stock from which the specialty paper was prepared.

In Table II below Paper C contained 100 parts of coarse Dacron fibers and 200 parts of polystyrene resin powder. Accordingly, this paper contained 33% by weight of coarse Dacron fibers and 67% by weight of polystyrene resin powder. Paper D in Table II below contained 100 parts of coarse Dacron fibers, 200 parts of polystyrene resin powder, and 15 parts of fine glass fibers having a diameter of 0.75 microns. Accordingly, Paper D contained 33% by weight of coarse Dacron fibers, 67% by weight of polystyrene resin powder, and 15% by weight of fine glass fibers based upon the weight of the coarse fibers present in the specialty paper.

*Table II*

| Fiber Mixture | Paper C | Paper D |
|---|---|---|
| Percent Resin Retention | approx. 50 | 95. |
| Dispersibility of Solids in Aqueous Suspension | very poor | good. |
| Uniformity of Resin Distribution in Paper | do | Do. |
| Two-sideness of Paper | very marked | very slight. |

From the data presented above in Table II it will be noted that Paper D produced in accordance with the process of the invention had a very high percent resin powder retention, good dispersibility of the paper stock, and uniform distribution of the resin powder within the specialty paper. Paper C, on the other hand which did not contain fine siliceous fibers had a very low resin powder retention, very poor dispersibility of the paper stock, and non-uniform distribution of resin powder within the specialty paper.

In Table III below there is presented data comparing the properties of a specialty paper produced in accordance with the process of the invention containing only 1% by weight of fine siliceous fibers based on the weight of coarse fibrous content of the paper and the properties of a specialty paper produced in accordance with the process of the invention but without any fine siliceous fibers being present as a resin retention and dispersion aid. In Table III below Paper E contained 40 parts of coarse glass fibers having a diameter of 5.5 microns and 60 parts of polyvinylchloride resin powder. Accordingly, Paper E contained 40% by weight of coarse glass fibers and 60% by weight of polyvinylchloride resin powder. Paper F in Table III below produced in accordance with the process of the invention contained 40 parts of coarse glass fibers having a diameter of 5.5 microns, 60 parts of polyvinylchloride resin powder, and 1% by weight of colloidized asbestos (0.02–0.05 micron diameter) fibers based on the coarse fibrous content of the paper. Accordingly, Paper F contained 40% by weight of coarse glass fibers, 60% by weight of polyvinylchloride resin powder, and 1% by weight of fine asbestos fibers based on the weight of the coarse fibers.

*Table III*

| Fiber Mixture | Paper E | Paper F |
|---|---|---|
| Percent Resin Retention | 55 | 92. |
| Dispersibility of Solids in Aqueous Suspension | fair | good. |

In Table IV below there is presented data comparing the properties of laminates prepared from paper produced by various processes including the process of the invention. Paper G contained 65% by weight of sulfite-cellulose fibers and 35% by weight of phenol formaldehyde resin and was produced by impregnating the paper with a solution of phenol formaldehyde resin. Paper H contained 65% by weight of sulfite-cellulose fibers and 35% by weight of phenol formaldehyde resin powder and was produced in accordance with the process of the invention but without using fine siliceous fibers. Paper I contained 65% by weight of coarse sulfite-cellulose fibers, 35% by weight of phenol formaldehyde resin powder, and 7.5% by weight of fine glass fibers having a diameter of 0.75 micron based on the weight of coarse fibers present in the paper and was produced in accordance with the process of the invention. Conventional laminating procedure was used in forming the laminates.

*Table IV*

| Laminate | Laminate Made from Paper G | Laminate Made from Paper H | Laminate Made from Paper I |
|---|---|---|---|
| Percent Resin Loss in Papermaking | none | 10–20 | 2–5. |
| Percent Moisture Absorbency | 4.7 | 7.7–11.0 | 4.9–5.2. |
| Appearance of Laminates | uniform | spotty, mottled | uniform. |
| Performance After Exposure to Water | no delamination | tends to delaminate | no delamination. |
| Uniformity of Moisture Absorbency | very even | uneven | even. |
| Sheet Formation | good | fair | good. |

The printability of the following specialty paper produced in accordance with the process of the invention and containing fine siliceous fibers as well as a filler was found to be good: 50% by weight coarse sulfite-cellulose fibers, 50% by weight of polyvinylacetate resin powder, 7.5% by weight of fine glass fibers having a diameter of 0.5 micron based on the weight of coarse fibers present in the specialty paper, 7.5% by weight of diatomaceous earth based on the fibrous content of the paper, and 7.5% by weight of titanium dioxide based on the fibrous content of the paper.

The printability of the following specialty paper produced in accordance with the process of the invention and containing fine siliceous fibers as well as fillers was found to be excellent: 50% by weight of coarse sulfite-cellulose fibers, 50% by weight of cellulose acetate resin powder, 15% by weight of fine glass fibers having a diameter of 0.5 micron based upon the weight of coarse fibers present in the paper, 7.5% by weight of diatomaceous earth based on the fibrous content of the paper, and 7.5% by weight of titanium dioxide based on the fibrous content of the paper.

In addition to the uses noted above, the specialty papers of the invention may be used in forming electrical laminates; laminates with dimensional stability; flame retardent laminates; laminates with improved chemical resistance; laminates with improved heat resistance; decorative laminates; decorative surfacing material to be laminated to wood, plywood, and the like; and tubing.

It will be understood that the products and process of the invention may be modified by those skilled in the art without departing from the spirit thereof. Accordingly, the invention is to be limited only within the scope of the appended claims.

I claim:

1. A water-laid specialty paper having resin powder uniformly and freely distributed in the interstices of the paper consisting of an interfelted fibrous web containing from about 30% to about 70% by weight of resin powder, from about 70% to about 30% by weight respectively of coarse fibers having a diameter greater than 2 microns, and from about 1% to about 20% by weight based on the weight of the coarse fibers of fine siliceous fibers having a diameter less than 2 microns.

2. A water-laid specialty paper as set forth in claim 1 containing an amount up to about 45% by weight of at least one filler based on the fibrous content of the paper.

3. A water-laid specialty paper having resin powder uniformly and freely distributed in the interstices of the paper consisting of an interfelted fibrous web containing from about 30% to about 70% by weight of resin powder, from about 70% to about 30% by weight respectively of coarse fibers having a diameter greater than 2 microns, and from about 1% to about 20% by weight based on the weight of the coarse fibers of fine glass fibers having a diameter from 0.1 to 2.0 microns.

4. A water-laid specialty paper having resin powder uniformly and freely distributed in the interstices of the paper consisting of an interfelted fibrous web containing from about 30% to about 70% by weight of resin powder, from about 70% to about 30% by weight respectively of coarse fibers having a diameter greater than 2 microns, and from about 1% to about 20% by weight based on the weight of coarse fibers of fine asbestos fibers having a diameter from 0.02 to 0.05 micron.

5. The process of producing a water-laid specialty paper having resin powder uniformly and freely distributed in the interstices of the paper comprising forming an aqueous suspension containing from about 30% to about 70% by weight of resin powder, from about 70% to about 30% by weight respectively of coarse fibers having a diameter greater than 2 microns, and from about 1% to about 20% by weight based on the weight of the coarse fibers of fine siliceous fibers having a diameter less than 2 microns; pumping the aqueous suspension to the headbox of a papermaking machine; forming a paper web; dewatering the web; and drying the web.

6. The process as set forth in claim 5 wherein the aqueous suspension contains an amount up to about 45% by weight of at least one filler based on the fibrous content of the paper.

7. The process of producing a water-laid specialty paper having resin powder uniformly and freely distributed in the interstices of the paper comprising forming an aqueous suspension containing from about 30% to about 70% by weight of resin powder, from about 70% to about 30% by weight respectively of coarse fibers having a diameter greater than 2 microns, and from about 1% to about 20% by weight based on the weight of the coarse fibers of fine glass fibers having a diameter from 0.1 to 2.0 micron; pumping the aqueous suspension to the headbox of a papermaking machine; forming a paper web; dewatering the web; and drying the web.

8. The process of producing a water-laid specialty paper having resin powder uniformly and freely distributed in the interstices of the paper comprising forming an aqueous suspension containing from about 30% to about 70% by weight of resin powder, from about 70% to about 30% by weight respectively of coarse fibers having a diameter greater than 2 microns, and from about 1% to about 20% by weight based on the weight of the coarse fibers of fine asbestos fibers having a diameter from 0.02 to 0.05 micron; pumping the aqueous suspension to the headbox of a papermaking machine; forming a paper web; dewatering the web; and drying the web.

References Cited in the file of this patent

UNITED STATES PATENTS

| | | |
|---|---|---|
| 1,684,755 | Clapp | Sept. 18, 1928 |
| 2,221,945 | Hanson | Nov. 19, 1940 |
| 2,477,000 | Osborne | July 26, 1949 |
| 2,496,665 | Hermanson | Feb. 7, 1950 |
| 2,581,069 | Bertlot | Jan. 1, 1952 |
| 2,706,156 | Arledter | Apr. 12, 1955 |
| 2,708,982 | McGuff | May 24, 1955 |
| 2,721,139 | Arledter | Oct. 18, 1955 |

FOREIGN PATENTS

| | | |
|---|---|---|
| 593,625 | Great Britain | Oct. 22, 1947 |
| 508,539 | Canada | Dec. 26, 1954 |